US009862266B2

(12) United States Patent
Brown et al.

(10) Patent No.: US 9,862,266 B2
(45) Date of Patent: Jan. 9, 2018

(54) VEHICLE FUEL FILLER SYSTEM SEAL

(71) Applicant: SRG Global, Inc., Warren, MI (US)

(72) Inventors: Stuart Brown, Windsor (CA); William Doroghazi, Livonia, MI (US); Brett Stone, West Bloomfield, MI (US); Peter Stokes, Rochester Hills, MI (US)

(73) Assignee: SRG Global, Inc., Warren, MI (US)

( * ) Notice: Subject to any disclaimer, the term of this patent is extended or adjusted under 35 U.S.C. 154(b) by 0 days.

(21) Appl. No.: 15/165,333

(22) Filed: May 26, 2016

(65) Prior Publication Data

US 2016/0263994 A1    Sep. 15, 2016

Related U.S. Application Data

(62) Division of application No. 14/512,712, filed on Oct. 13, 2014, now Pat. No. 9,376,012.

(51) Int. Cl.
*B62D 25/00* (2006.01)
*B60K 15/05* (2006.01)
*B60K 15/03* (2006.01)

(52) U.S. Cl.
CPC .... *B60K 15/05* (2013.01); *B60K 2015/03447* (2013.01); *B60K 2015/053* (2013.01)

(58) Field of Classification Search
CPC .............. B60K 15/04; B60K 15/05; B60K 2015/0429; B60K 15/0406; B60K 2015/0483; C21B 13/00; C21B 5/003; C21C 2005/366; C21C 5/4606; C21C 5/5217
USPC ...................................................... 296/97.22
See application file for complete search history.

(56) References Cited

U.S. PATENT DOCUMENTS

| 2,663,447 A | * | 12/1953 | Westcott | ............ B60K 15/0406 220/314 |
| 3,643,755 A | * | 2/1972 | Gionet | .................... E05D 3/125 16/222 |
| 4,971,382 A | * | 11/1990 | Ohno | ..................... B60K 15/05 16/291 |
| 5,044,678 A | * | 9/1991 | Detweiler | ............. E05B 47/026 292/144 |
| 5,437,491 A | * | 8/1995 | Nedbal | .............. B60K 15/0406 220/86.2 |
| 5,462,190 A | * | 10/1995 | Lienhart | ............ B60K 15/0406 220/375 |

(Continued)

FOREIGN PATENT DOCUMENTS

EP         1065086 A2      1/2001
KR      10-0747201 B1      8/2007

OTHER PUBLICATIONS

International Search Report and Written Opinion for corresponding PCT/US2015/055114 dated Jan. 18, 2016.

*Primary Examiner* — Kiran B Patel
(74) *Attorney, Agent, or Firm* — Harness, Dickey & Pierce, P.L.C.

(57) ABSTRACT

A fuel door assembly for a motor vehicle is provided. The fuel door assembly includes a housing, a fuel door and a door seal. The fuel door is hingedly supported by the housing for rotation between an open position and a closed position. The door seal includes a proximal edge supported by the housing and a distal edge separated from the housing. The door seal has an arcuate shape extending from the proximal edge to the distal edge when the fuel door is in the open position.

6 Claims, 8 Drawing Sheets

(56) References Cited

U.S. PATENT DOCUMENTS

| | | | |
|---|---|---|---|
| 5,658,036 A * | 8/1997 | Benoist | B60K 15/05 220/86.2 |
| 5,664,811 A * | 9/1997 | Martus | B60K 15/05 292/144 |
| 5,906,406 A * | 5/1999 | Pajakowski | B60K 15/05 220/86.2 |
| 5,954,387 A * | 9/1999 | Fisher | B60K 15/0406 220/86.2 |
| 6,007,141 A * | 12/1999 | Thomas | B60J 5/06 292/DIG. 46 |
| 6,189,959 B1 * | 2/2001 | VanAssche | B60K 15/05 16/86 B |
| 6,315,144 B1 * | 11/2001 | Foltz | B60K 15/0406 220/255 |
| 6,352,295 B1 * | 3/2002 | Leitner | B60K 15/05 16/255 |
| 6,508,501 B1 * | 1/2003 | Meinke | B60K 15/04 220/297 |
| 6,539,990 B1 * | 4/2003 | Levey | B60K 15/0406 141/301 |
| 6,752,448 B1 * | 6/2004 | Hsu | B60K 15/05 220/86.2 |
| 6,834,688 B2 * | 12/2004 | Ono | F17C 6/00 141/94 |
| 7,185,938 B2 * | 3/2007 | Beck | B60K 15/04 292/207 |
| 7,281,640 B2 * | 10/2007 | Hagano | B60K 15/0406 220/375 |
| 7,311,348 B1 * | 12/2007 | Bang | B60K 15/0406 220/86.2 |
| 7,671,482 B2 * | 3/2010 | Tighe | B60L 11/1881 141/348 |
| 7,753,431 B2 * | 7/2010 | Yamamoto | B60K 15/0406 220/DIG. 33 |
| 7,914,063 B2 * | 3/2011 | Lederer | B60K 15/04 292/207 |
| 7,922,231 B2 * | 4/2011 | Schoenow | B60K 15/05 296/97.22 |
| 7,926,678 B2 * | 4/2011 | Newport | B60K 15/0406 220/375 |
| 7,988,453 B2 * | 8/2011 | Loo | B60L 11/1818 439/142 |
| 8,186,738 B2 * | 5/2012 | Winkler | B60K 15/05 220/DIG. 33 |
| 8,684,443 B2 * | 4/2014 | Hara | B60R 19/48 296/97.22 |
| 9,038,499 B2 * | 5/2015 | Ishiguro | B60K 15/05 220/315 |
| 9,067,489 B2 * | 6/2015 | Rovik | B60K 15/05 |
| 9,227,509 B1 * | 1/2016 | Jones | B60K 15/05 |
| 2003/0173362 A1 * | 9/2003 | Ishida | B60K 15/0406 220/375 |
| 2005/0155671 A1 * | 7/2005 | McClung | B60K 15/035 141/350 |
| 2005/0280276 A1 * | 12/2005 | McComsey | B60K 15/05 296/97.22 |
| 2006/0284440 A1 * | 12/2006 | Leitner | B60K 15/0406 296/97.22 |
| 2007/0040409 A1 * | 2/2007 | Alfaro | B60K 15/05 296/97.22 |
| 2007/0045322 A1 * | 3/2007 | Hagano | B60K 15/0406 220/375 |
| 2008/0136210 A1 * | 6/2008 | Scott | B60K 15/04 296/97.22 |
| 2009/0026794 A1 * | 1/2009 | Zentner | B60K 15/05 296/97.22 |
| 2009/0139991 A1 * | 6/2009 | Nakaya | B60K 15/05 220/315 |
| 2009/0189410 A1 * | 7/2009 | Gurtatowski | B60K 15/05 296/97.22 |
| 2011/0025087 A1 * | 2/2011 | Ramos | B60K 15/05 296/97.22 |
| 2012/0153661 A1 * | 6/2012 | Woodworth | B60K 15/05 296/97.22 |
| 2012/0161462 A1 | 6/2012 | Zentner | |
| 2013/0134737 A1 * | 5/2013 | Ogata | B60K 15/05 296/97.22 |
| 2013/0249234 A1 * | 9/2013 | Higgins | B60K 15/05 296/97.22 |
| 2013/0249235 A1 * | 9/2013 | Lorenc | B60K 15/04 296/97.22 |
| 2014/0059932 A1 * | 3/2014 | Zia | B60K 15/04 49/279 |
| 2015/0048644 A1 * | 2/2015 | Georgi | B60K 15/05 296/97.22 |

* cited by examiner

VEHICLE FUEL FILLER SYSTEM SEAL

CROSS-REFERENCE TO RELATED APPLICATIONS

This application is a divisional application of U.S. patent application Ser. No. 14/512,712 filed on Oct. 13, 2014. The entire disclosure of the above application is incorporated herein by reference.

FIELD

The present disclosure relates to fuel door assembly used in a motor vehicle, and more particularly to a seal configuration used on the fuel door assembly.

BACKGROUND

This section provides background information related to the present disclosure and is not necessarily prior art.

Automobiles and other vehicles include fuel systems having a fuel tank, a fuel inlet, and fuel door assembly. The fuel door assembly can be mounted to the body of the vehicle and used to provide access to the fuel tank through the fuel inlet. The fuel door assembly can also prevent water and other contaminants from reaching or otherwise contaminating the fuel in the fuel tank or other portions of the fuel system. In this regard, fuel door assemblies often include a fuel door and a sealing mechanism to prevent contaminants from reaching the fuel inlet and/or the fuel tank when the fuel door is in a closed position.

While known fuel door assemblies have generally proven to be acceptable for their intended purposes, a continuous need for improvement in the relevant art remains.

SUMMARY

This section provides a general summary of the disclosure, and is not a comprehensive disclosure of its full scope or all of its features.

In accordance with a first aspect of the present disclosure, a fuel door assembly for a motor vehicle is provided. The fuel door assembly may include a housing, a fuel door and a door seal. The fuel door may be hingedly supported by the housing for rotation between an open position and a closed position. The door seal may include a proximal edge supported by the housing and a distal edge separated from the housing. The door seal has an arcuate shape extending from the proximal edge to the distal edge when the fuel door is in the open position.

In some configurations, the door seal may include a convex surface facing the fuel door when the fuel door is in the open position.

In some configurations, the convex surface may be operable to engage an inner surface of the fuel door when the fuel door is in the closed position.

In some configurations, the housing may include an outer wall, a distal end, and a chamfered surface extending from and between the outer wall and the distal end. The proximal edge of the door seal may be coupled to the chamfered surface of the housing.

In some configurations, a normal to the chamfered surface may define an angle with the inner surface of the fuel door when the fuel door is in a closed position.

In some configurations, the angle may be between ten degrees and eighty degrees.

In some configurations, the angle may be substantially equal to forty-five degrees.

In some configurations, the housing may include a radially-extending flange portion.

In some configurations, the fuel door assembly may include a body seal supported by the radially-extending flange portion.

In some configurations, the housing may include a proximal end and a distal end. The radially-extending flange portion may be disposed between the proximal and distal ends.

In some configurations, the fuel door may include an annular lip operable to engage the door seal.

In accordance with another aspect of the present disclosure, a fuel door assembly for a motor vehicle is provided. The fuel door assembly may include a housing, a fuel door and a door seal. The fuel door may be hingedly supported by the housing between an open position and a closed position, and may include an annular lip. The door seal may be supported by the housing, and may be operable to engage the annular lip when the fuel door is in the closed position.

In some configurations, the annular lip may include a radially inwardly facing surface. The door seal may engage the radially inwardly facing surface when the fuel door is in the closed position.

In some configurations, the housing may include a radially outwardly facing surface. The door seal may be coupled to the radially outwardly facing surface.

In some configurations, the housing may include a radially-extending flange portion.

In accordance with yet another aspect of the present disclosure, a fuel door assembly for a motor vehicle is provided. The fuel door assembly may include a housing, a fuel door and a door seal. The fuel door may be hingedly supported by the housing between an open position and a closed position. The fuel door may include a radially-extending surface and a radially inwardly facing surface. The door seal may be supported by the housing and may be operable to engage the radially-extending surface and the radially inwardly facing surface when the fuel door is in the closed position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
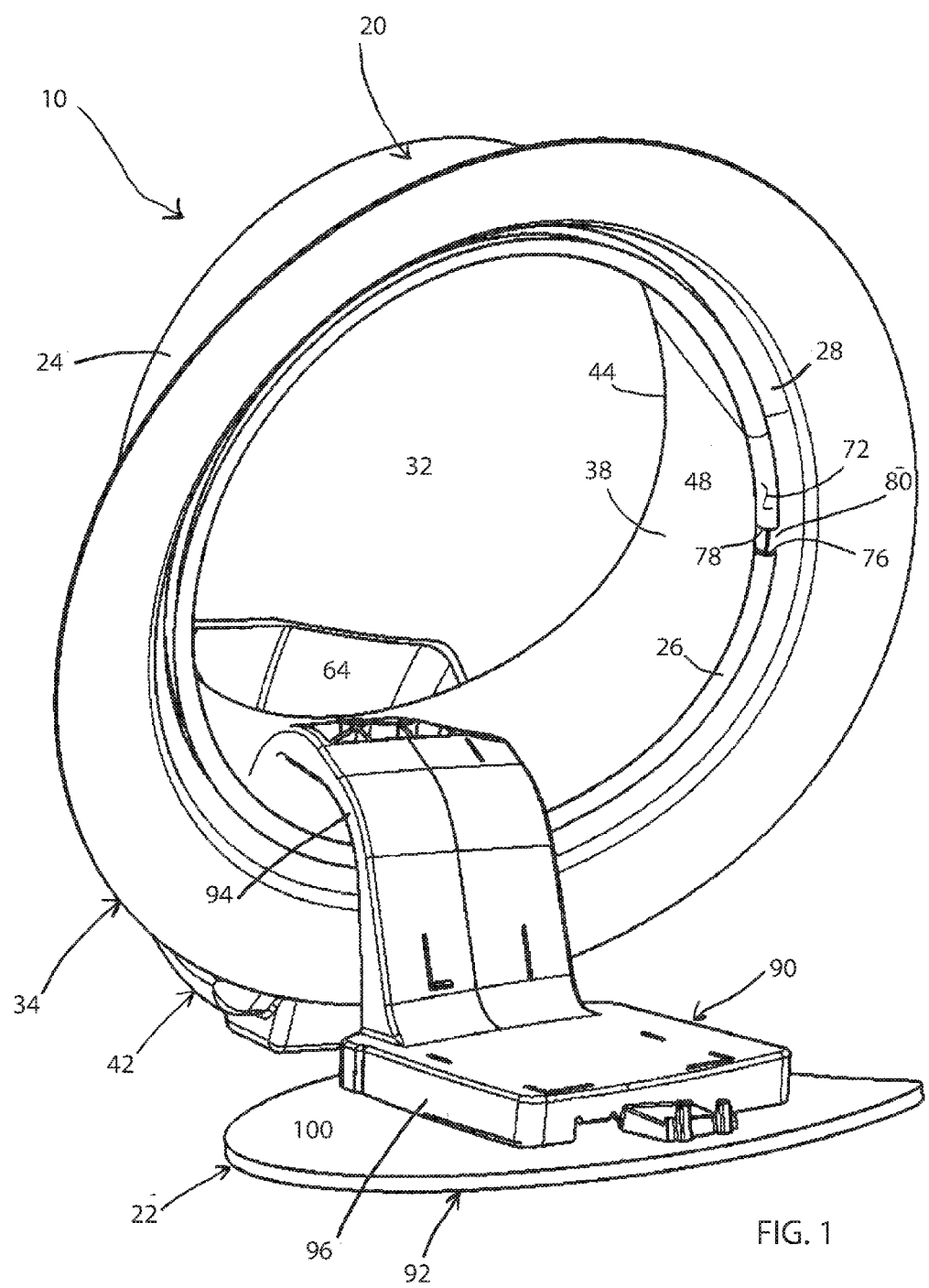
FIG. 1 is a perspective view of a fuel door assembly in accordance with the principles of the present disclosure, the fuel door assembly shown in a first or open position.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

With initial reference to FIGS. 1-4, a fuel door assembly constructed in accordance with the present disclosure is illustrated and identified at reference character 10. The fuel door assembly 10 may be used with an automobile (not shown) or other similar vehicle having a fuel system (not shown), including a fuel tank (not shown). In this regard, the fuel door assembly 10 may be used to provide access to, and prevent contamination of, the fuel tank or other portion of the fuel system.

Figure 3:
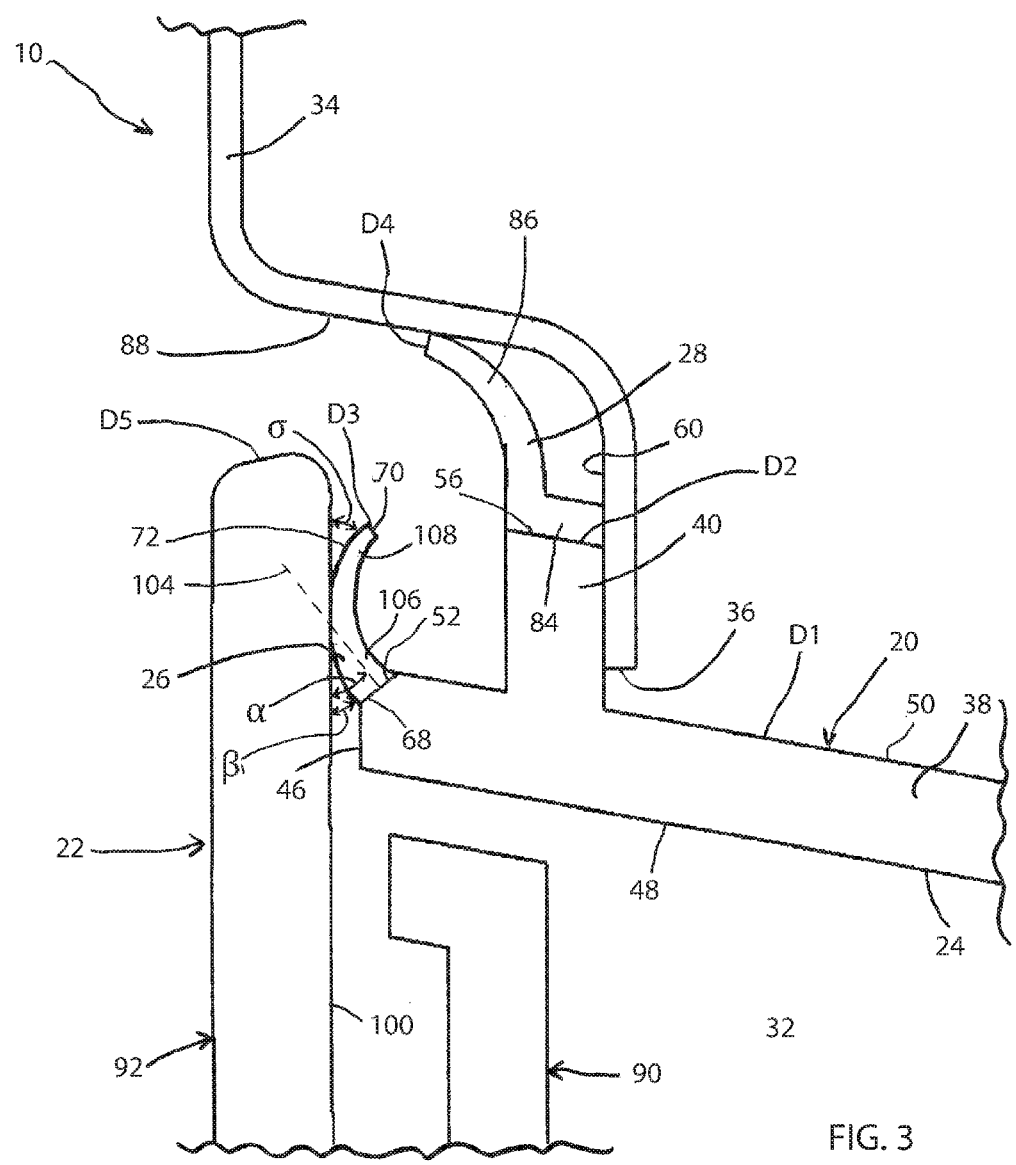
FIG. 3 is a cross-sectional view of the fuel door assembly of FIG. 1, the fuel door assembly shown in a second or closed position.

The fuel door assembly 10 may include a housing subassembly 20 and a door subassembly 22. The door subassembly 22 may be hingedly mounted relative to the housing subassembly 20, such that the door subassembly 22 provides access to the housing subassembly 20 in a first or open position (FIG. 1), and prevents access to the housing subassembly in a second or closed position (FIG. 3). The housing subassembly 20 may include a housing 24, a first or door seal 26 and a second or body seal 28. The housing 24 may define an inner chamber 32. In an assembled configuration, the housing 24 may be coupled to a body portion 34 of the vehicle, such that the inner chamber 32 provides access to the fuel tank. In this regard, as illustrated in at least FIG. 3, the body portion 34 may include an aperture or opening 36. The housing 24 may be disposed within the opening 36 such that the inner chamber 32 can provide access to the fuel tank.

Figure 2:
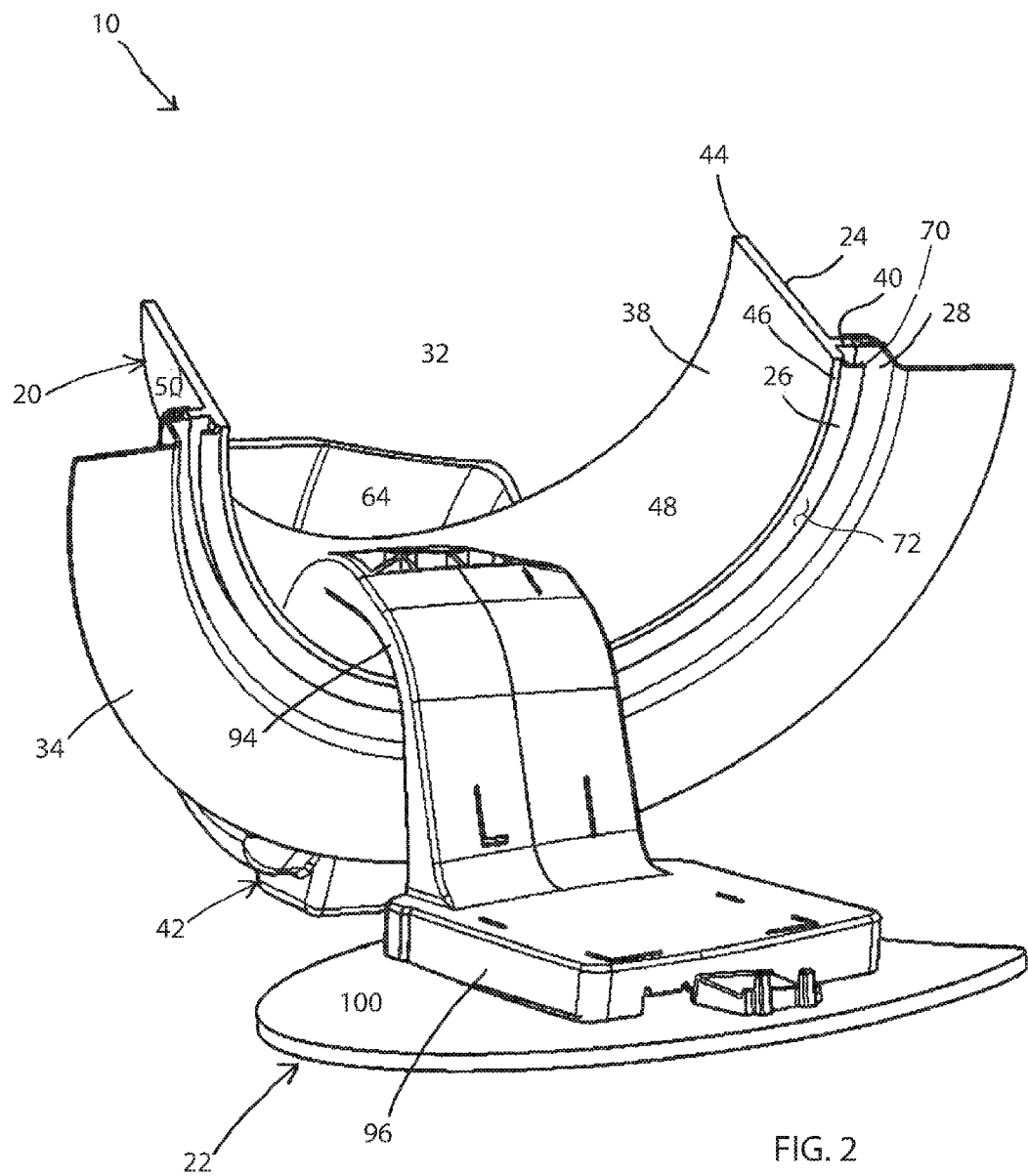
FIG. 2 is a cross-sectional perspective view of a portion of the fuel door assembly of FIG. 1.

The housing 24 may include an outer or peripheral wall portion 38, a flange portion 40, and a hinge-receiving portion 42. While the wall, flange and hinge-receiving portions 38, 40, 42 are described separately herein, it will be appreciated that the wall, flange and hinge-receiving portions 38, 40, 42 may be integrally formed, such that the housing 24 is a monolithic construct. With reference to FIG. 2, the wall portion 38 may extend from a proximal end 44 to a distal end 46, and may include an inner surface 48 at least partially surrounding the inner chamber 32, an outer surface 50 generally facing the body portion 34 of the vehicle, and a chamfered surface 52 (FIG. 3). With reference to FIG. 3, the outer surface 50 may define a first outer diameter D1 of the housing 24. The chamfered surface 52 may extend from and between the distal end 46 and the outer surface 50 of the housing 24. In this regard, the chamfered surface 52 may extend about the periphery of the housing 24.

Figure 4:
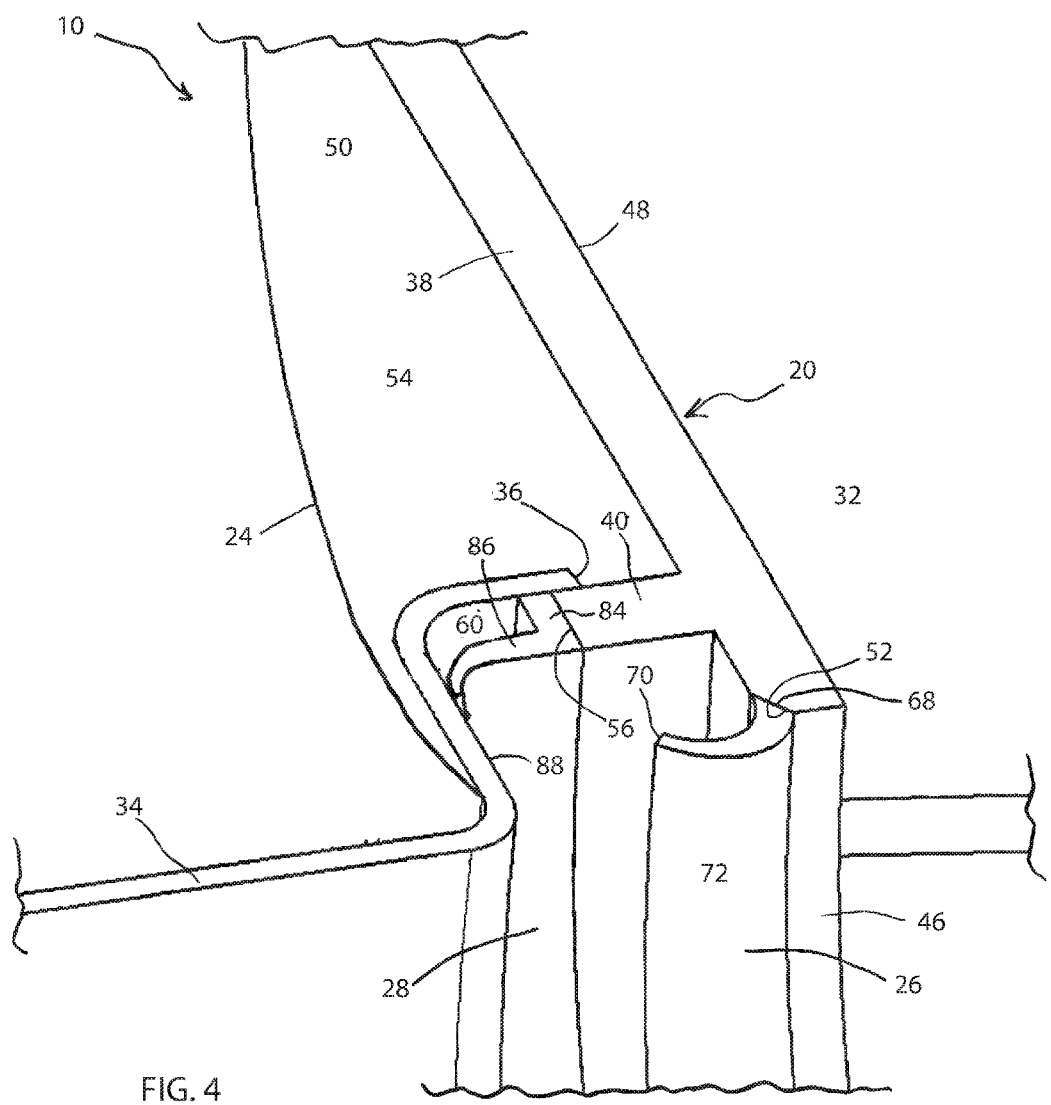
FIG. 4 is a cross-sectional perspective view of a portion of the fuel door assembly of FIG. 1.
Figure 5:
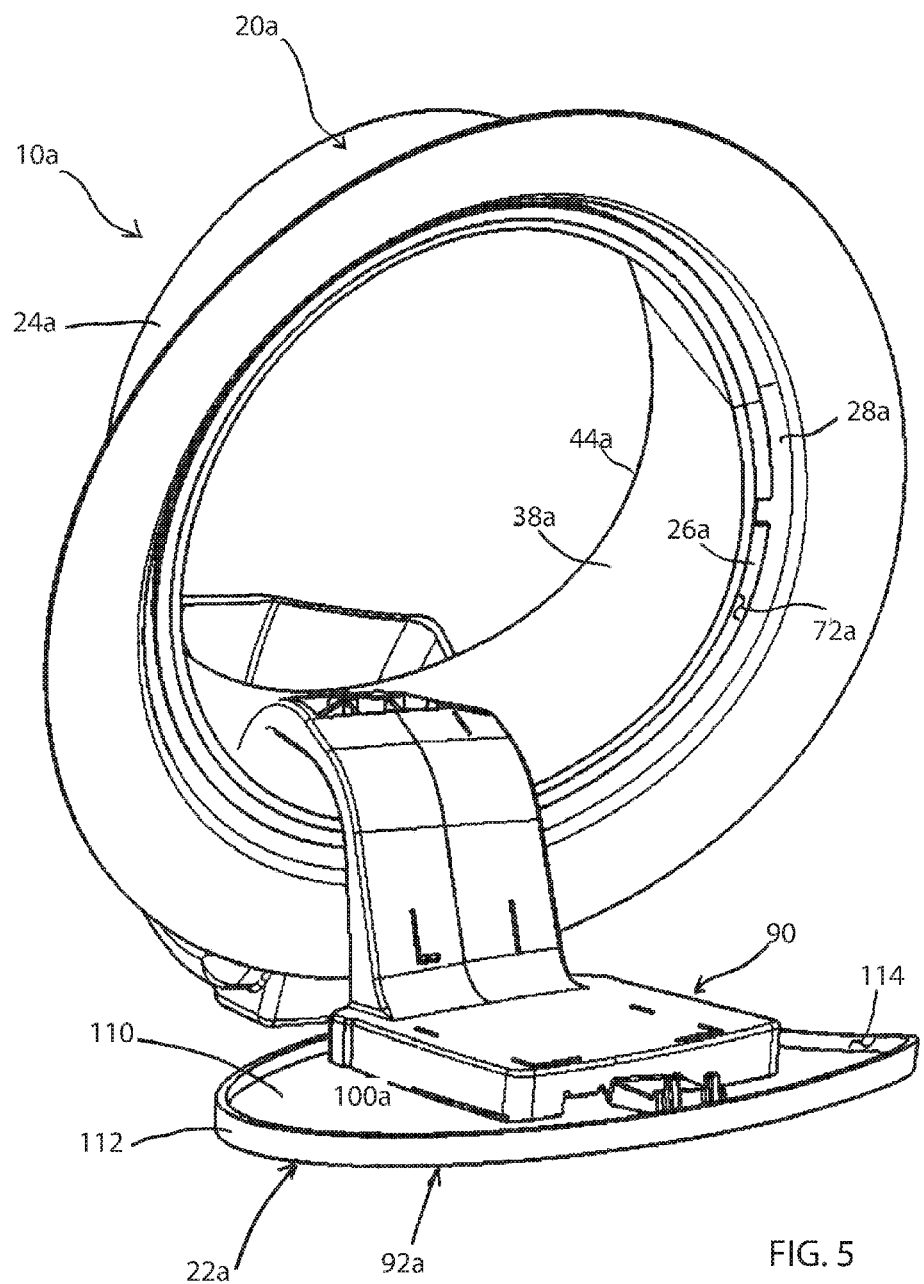
FIG. 5 is a perspective view of another fuel door assembly in accordance with the principles of the present disclosure, the fuel door assembly shown in a first or open position.
Figure 6:
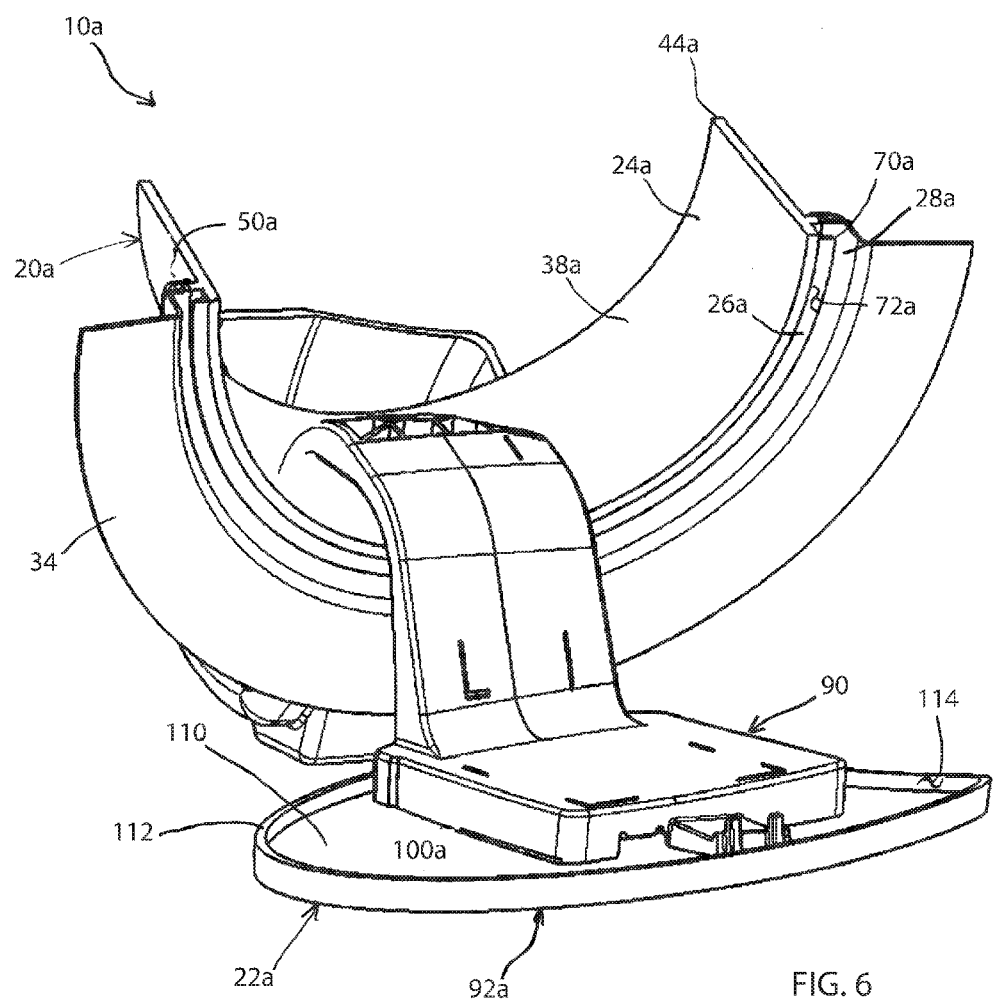
FIG. 6 is a cross-sectional perspective view of a portion of the fuel door assembly of FIG. 5.

With reference to FIGS. 3 and 4, the flange portion 40 may be supported by, and extend radially outwardly from, the outer surface 50 of the housing 24. In this regard, the flange portion 40 may be disposed between the proximal and distal ends 44, 46 of the wall portion 38, such that, as illustrated in FIG. 4, the flange portion 40 may separate the outer surface 50 into a first or proximal portion 54 and a second or distal portion 55. The flange portion 40 may extend about the periphery of the housing 24 and may include a distal end 56. The distal end 56 may face radially outwardly. The distal end 56 may define a second outer diameter D2 of the housing 24, greater than the first outer diameter D1. As illustrated in FIG. 4, in an assembled configuration, the housing 24 may be disposed within the opening 36 of the body portion 34 such that the flange portion 40 is supported by or coupled to a radially extending outer surface 60 of the body portion 34.

With reference to FIGS. 1 and 2, the hinge-receiving portion 42 of the housing 24 may extend radially outwardly from the wall portion 38. In this regard, the hinge-receiving portion 42 may define a radially outwardly extending chamber 64 in fluid communication with the inner chamber 32 of the housing 24.

With reference to FIGS. 3 and 4, the door seal 26 may include a proximal edge 68 and a distal edge 70. The door seal 26 may define a generally arcuate cross-sectional shape extending from the proximal edge 68 to the distal edge 70 when the door subassembly 22 is in the open position. In this regard, as illustrated in FIGS. 1-4, the door seal 26 may include a generally convex outer surface 72 extending from and between the proximal and distal edges 68, 70, such that the door seal 26 includes a substantially U- or C-shaped cross-sectional shape. With reference to FIG. 3, the distal edge 70 of the door seal 26 may define a third outer diameter D3 that is greater than the first outer diameter D1 of the housing 24 and less than the second outer diameter D2 of the housing 24.

The proximal edge 68 of the door seal 26 may be coupled to, or otherwise supported by, at least one of the distal end 46, the outer surface 50, and/or the chamfered surface 52 of the wall portion 38. As illustrated in FIGS. 3 and 44, in some configurations the proximal edge 68 of the door seal 26 is supported by the chamfered surface 52 of the wall portion 38, such that a proximal portion of the outer surface 72 of the door seal 26 faces, or is otherwise inclined, radially inwardly toward the chamber 32, and a distal portion of the outer surface 72 faces, or is otherwise inclined radially outwardly away from the chamber 32. As illustrated in FIG. 1, the door seal 26 may extend from a first end 76 to a second end 78 about the periphery of the wall portion 38. In some configurations, the first end 76 and the second end 78 may define a peripherally extending void or gap 80 therebetween. In the assembled configuration, the gap 80 may be disposed at the bottom (relative to the view in FIG. 1) of the housing 24.

With reference to FIGS. 3 and 4, the body seal 28 may include a proximal portion 84 and a distal portion 86. The proximal and distal portions 84, 86 may define a generally L-shaped cross section. In this regard, in the assembled configuration, the proximal portion 84 may include an axially extending portion, and the distal portion 86 may include a radially extending portion. The proximal portion 84 of the body seal 28 may be coupled, to or otherwise supported by, the flange portion 40 of the housing 24, such that the distal portion 86 extends radially outwardly from the flange portion 40. In some configurations, the proximal portion 84 may be coupled to the distal end 56 of the flange portion 40. As illustrated in FIG. 3, the body seal 28 may extend about the periphery of the wall portion 38 of the housing 24, such that the distal portion 86 includes a fourth outer diameter D4 that is greater than the first, second and third outer diameters D1, D2 and D3. Accordingly, as illustrated in FIGS. 3 and 4, in the assembled configuration, the distal portion 86 may engage an axially extending surface 88 of the body portion 34 of the vehicle to provide at least one peripheral or surrounding seal between the housing 24 and the body portion 34. In some configurations, the proximal portion 84 of the body seal 28 may engage the radially extending outer surface 60 of the body portion 34 to provide another peripheral or surrounding seal between the housing 24 and the body portion 34.

As illustrated in FIGS. 1-3, the door subassembly 22 may include a hinge assembly or member 90 and a fuel door 92. The hinge member 90 may include a proximal portion 94 coupled to the housing 24, and a distal portion 96 coupled to the door 92. In this regard, the proximal portion 94 may be coupled to the hinge-receiving portion 42 of the housing 24, such that the proximal portion 94 is disposed within the chamber 64 when the door subassembly 22 is in the closed position, and such that the proximal portion 94 extends from the chamber 64 when the door subassembly 22 in the open position.

The fuel door 92 may include an inner or sealing surface 100 having a fifth outer diameter D5 (FIG. 3). The fifth outer diameter D5 may be greater than the third outer diameter D3 of the door seal 26 and the second outer diameter D2 of the housing 24. In some configurations, the sealing surface 100 may be substantially planar. With reference to FIG. 3, when the door subassembly 22 is in the closed position, a normal 104 to the chamfered surface 52 of the housing 24 may define an angle α with the sealing surface 100. The angle α may be between ten degrees and eighty degrees. In some configurations, the angle α may be substantially equal to forty-five degrees. In other configurations, when the door subassembly 22 is in the closed position, a proximal portion 106 of the door seal 26 may define an angle β with the sealing surface 100, and a distal portion 108 of the door seal 26 may define an angle σ with the sealing surface 100. The angle β may be between ten degrees and eighty degrees, and the angle σ may be between one hundred degrees and one hundred seventy degrees. The angles α, β and/or σ, as well as the arcuate configuration (e.g., convex outer surface 72) of the door seal 26 between the proximal and distal edges 68, 70 may help to maintain and/or improve the integrity of the sealing engagement between the door seal 26 and the fuel door 92.

With reference to FIGS. 5-8, another fuel door assembly 10a is provided. The structure and function of the fuel door assembly 10a may be similar or identical to the structure and function of the fuel door assembly 10 described above, apart from any exceptions described below and/or shown in the figures. Accordingly, similar features will not be described again in detail. Like reference numerals are used hereinafter and in the drawings to identify like components, while like reference numerals containing letter extensions are used to identify those components that have been modified.

Figure 7:
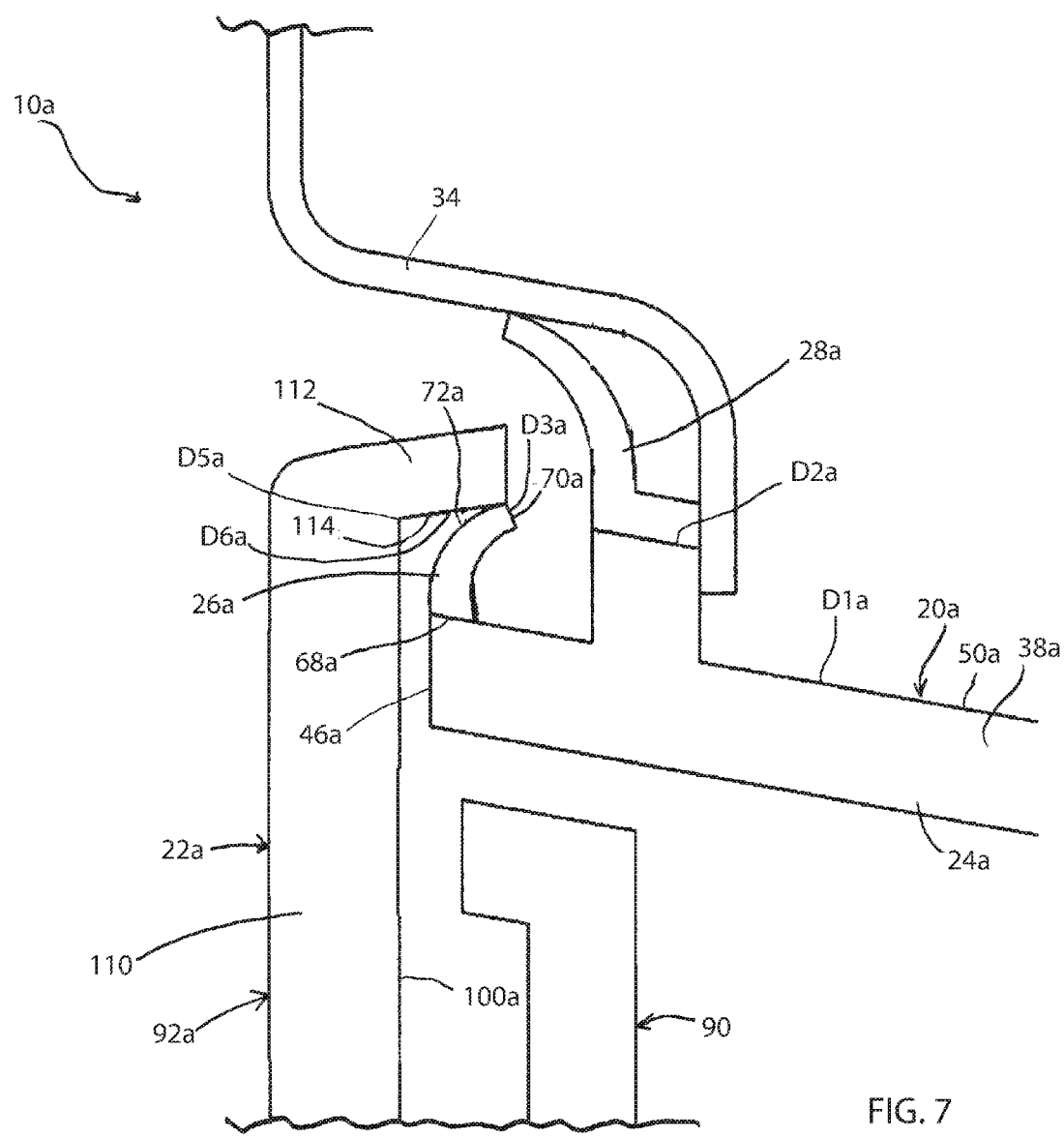
FIG. 7 is a cross-sectional view of the fuel door assembly of FIG. 5, the fuel door assembly shown in a second or closed position.

The fuel door assembly 10a may include a housing subassembly 20a and a door subassembly 22a. The housing subassembly 20a may include a housing 24a, a door seal 26a, and the body seal 28. The housing 24a may include a wall portion 38a extending from a proximal end 44a to a distal end 46a, and an outer surface 50a generally facing the body portion 34 of the vehicle. As illustrated in FIG. 7, the outer surface 50a may define a first outer diameter D1a of the housing 24a.

Figure 8:
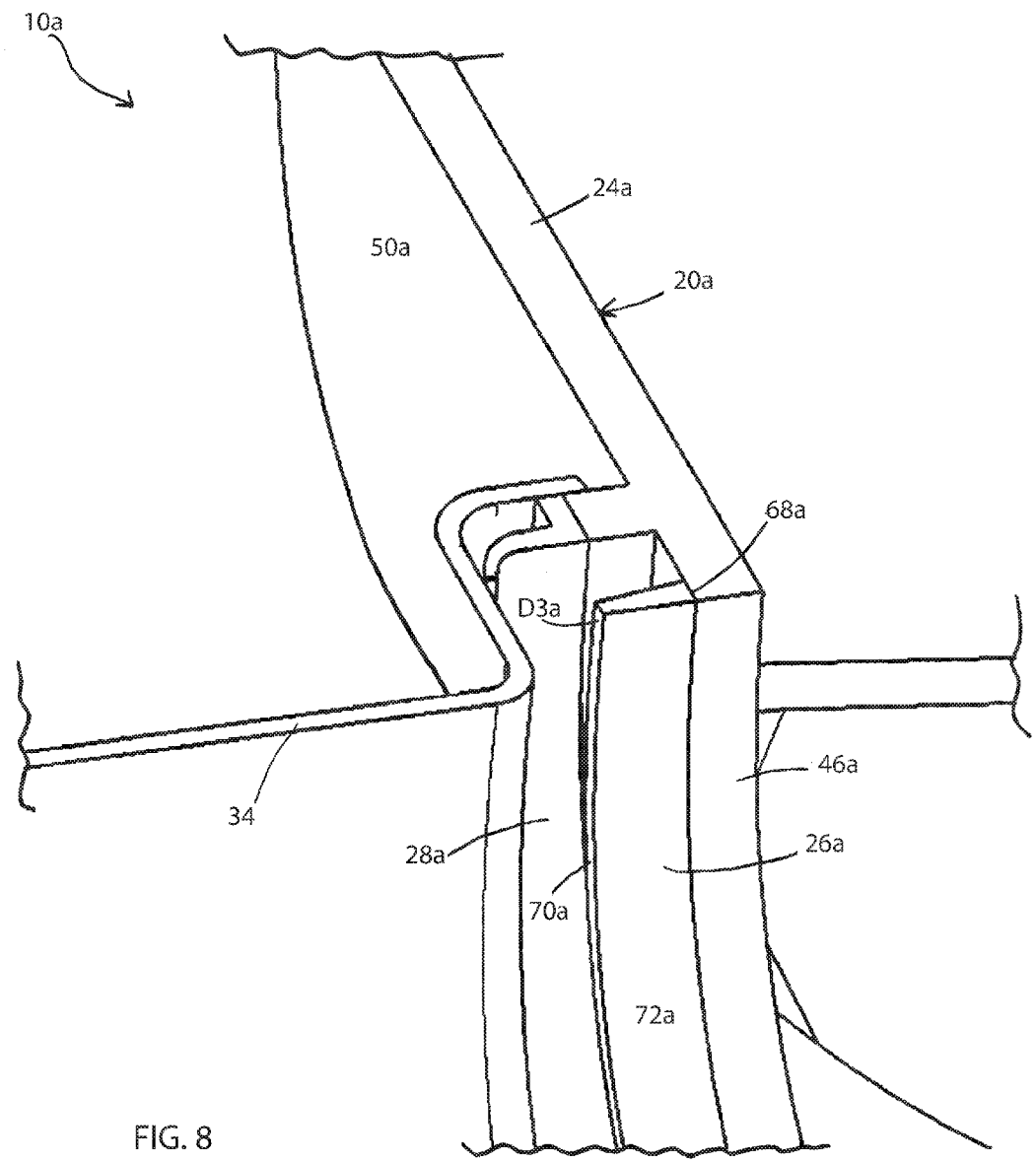
FIG. 8 is a cross-sectional perspective view of a portion of the fuel door assembly of FIG. 5.

With reference to at least FIGS. 7 and 8, the door seal 26a may include a proximal edge 68a and a distal edge 70a. The proximal edge 68a of the door seal 26a may be coupled to, or otherwise supported by, the distal end 46a and/or the outer surface 50a of the wall portion 38a, such that the door seal 26a extends radially outwardly. As illustrated in FIG. 8, the distal edge 70a of the door seal 26a may define a third outer diameter D3a.

The door subassembly 22a may include the hinge member 90 and a fuel door 92a. The fuel door 92a may include a radially extending portion 110 and an annular lip or flange portion 112. With reference to FIG. 7, the radially extending portion 110 may include a radially extending sealing surface 100a having a fifth outer diameter D5a. The fifth outer diameter D5a may be greater than the second outer diameter D2a of the housing 24a and less than the third outer diameter D3a of the door seal 26a. In some configurations, the sealing surface 100a may be substantially planar. The flange portion 112 may extend axially from the radially extending portion 110. In this regard, the flange portion 112 may extend axially inward, such that the flange portion 112 overlaps the distal end 46a of the housing 24a when the fuel door subassembly 22a is in the closed position. As illustrated in FIG. 7, the flange portion 112 may include a second sealing surface 114 having a sixth outer diameter D6a. The sixth outer diameter D6a may be greater than the second outer diameter D2a of the housing 24a and less than the third outer diameter D3a of the door seal 26a. The second sealing surface 114 may extend axially from the portion 110, such that the second sealing surface 114 generally faces the outer surface 50a of the housing 24a when the fuel door subassembly 22a is in the closed position.

When the fuel door subassembly 22a is in the closed position, the door seal 26a may contact and provide a sealing engagement between at least one of the sealing surface 100a and the sealing surface 114. Accordingly, as illustrated in FIG. 7, when the door subassembly 22a is in the closed position, the door seal 26a may define a generally arcuate cross-sectional shape extending from the proximal edge 68a to the distal edge 70a. In this regard, when the door assembly 22a is in the closed position, the door seal 26a may include a generally convex outer surface 72a extending from and between the proximal and distal edges 68a, 70a.

The flange portion 112, as well as the diameters D2a, D3a and D6a of the housing 24a, the door seal 26a and the sealing surface 114, respectively, may help to maintain and/or improve the integrity of the sealing engagement between the door seal 26a and the fuel door 92a.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A fuel door assembly for a motor vehicle, the fuel door assembly comprising:
    a housing;
    a fuel door hingedly supported by the housing between an open position and a closed position, the fuel door including an annular lip; and
    a door seal supported by the housing, the door seal operable to engage the annular lip when the fuel door is in the closed position.

2. The fuel door assembly of claim 1, wherein the annular lip includes a radially inwardly facing surface, and wherein the door seal engages the radially inwardly facing surface when the fuel door is in the closed position.

3. The fuel door assembly of claim 1, wherein the housing includes a radially outwardly facing surface, and wherein the door seal is coupled to the radially outwardly facing surface.

4. The fuel door assembly of claim 1, wherein the housing includes a radially-extending flange portion.

5. The fuel door assembly of claim 4, further comprising a body seal supported by the radially-extending flange portion.

6. The fuel door assembly of claim 5, wherein the housing includes a proximal end and a distal end, and wherein the radially-extending flange portion is disposed between the proximal and distal ends.

* * * * *